Dec. 5, 1967     G. C. BRUMLIK     3,355,820
COMBINED FRAMEWORK AND SPACE-FILLING
MOLECULAR MODEL ASSEMBLY
Filed Oct. 21, 1965

INVENTOR.
GEORGE C. BRUMLIK
BY
Edward F. Levy
ATTORNEY

3,355,820
COMBINED FRAMEWORK AND SPACE-FILLING MOLECULAR MODEL ASSEMBLY
George Charles Brumlik, 165 Pinehurst Ave., New York, N.Y. 10033
Filed Oct. 21, 1965, Ser. No. 499,865
14 Claims. (Cl. 35—18)

The present invention relates to models used for representing atoms and molecules, and in particular to models of the type capable of accurate representation of physical and geometric relationships of molecular and atomic orbitals.

In accordance with modern theories of valence and molecular structure, the characteristic shapes, volumes and spacial orientation of atomic and molecular orbitals have become an important consideration in explaining the physical states of elements and compounds and their chemical reactions. The nature of the transition state in chemical reactions is determined by the geometry of the participating molecular orbitals. In accordance with these modern theories of valence and molecular orbitals, a fully saturated atom, which is bonded to other atoms only by sigma bonds and carries no unshared electron pairs, is spherical and its radius is called the covalent radius. Where the atom is not fully saturated, electronic orbital lobes are found to extend from the surface of the covalent core in geometric patterns beyond the covalent core of the atom. Such lobes are traced by unshared electron pairs, a lone electron, or by electrons which form polynuclear pi orbitals. Sigma bond orbitals, which are located mainly between the atoms which they unite, do not contribute to the molecular volume although they affect the size of the covalent core of the atom.

Molecular models have been devised to depict accurately the size, volume and spacial relationships of atomic and molecular orbitals, such models being of two types. In my prior United States Patent No. 3,080,662, issued Mar. 12, 1963, I have disclosed molecular models which include molecular and atomic orbitals made in a three-dimensional solid form, approximating the actual shape of the molecular geometry. Components of this model set include solid spherical, ellipso-conical and frusto conical members, for example. Such solid components, when fitted together to form a completed model, interfit closely and provide a mass of solid parts which are referred to as a "space-filling" molecular model. Such models have the advantage of visually presenting an accurate molecular shape and geometry, but have the disadvantage of providing an outer configuration which is so bulky as to obscure the inner structural details of the model.

The second type of orbital model is shown and described in my co-pending U.S. patent application Ser. No. 356,546 filed Apr. 1, 1964, and is referred to as a "framework" molecular orbital model assembly. This type of model has a framework construction which outlines the orientation of the symmetry axes and the symmetry planes of atomic and molecular orbitals in three dimensions, and illustrates on a relative scale the extent to which these orbitals reach out into molecular space. In this type of model, elongated tubular members are interconnected by angular couplings and are so arranged that the bond angles may be selectively varied and the distance between atoms and the relative sizes of atoms may be accurately depicted. By coloration of the tubing, various atoms are represented, and the tubing lengths depict to accurate scale the sigma bond distances between bonded atoms, as well as the Van der Waals radii of unshared electron pair orbitals, pi orbitals, etc., which factors are difficult to observe in "space-filling" models.

The object of the present invention is to provide in one model assembly all of advantages of both the "space-filling" and "framework" types of orbial model sets. For this purpose, there is provided tubular components and angular coupling units therefore, by means of which a framework model may be constructed to present to view both the inner and outer molecular parameters. The assembly also includes solid forms which may be removably attached to the assembled tubular pieces to produce a "space-filling" model depicting the true molecular shapes of the atoms and orbitals.

Another object of the invention is the provision of a model assembly of the character described in which at least some of the space-filling members are made in multiple sections, so constructed as to fit accurately over the corresponding portion of the assembled framework pieces, and are held together by releasable locking means so that they may be conveniently removed or partially removed to reveal the inner framework structure and geometrical shape.

A further object of the invention is the provision of a model assembly of the character described capable of forming combined framework and space-filling orbital models, and utilizing relatively few light-weight parts which are economical in manufacture and easily assembled.

In accordance with the invention herein there is provided a molecular model assembly comprising a framework structure and a plurality of space-filling members adapted to be mounted thereon to convert said framework structure into a molecular model. The frame-work structure comprises a plurality of elongated cylindrical sections meeting at a central point representing the center of an atom and extending outwardly therefrom in accordance with the symmetry axis of valence orbitals and bond angles of said central atom. The cylindrical sections have inner color-coded portions of lengths representing to scale the covalent radius of the central atom and outer color-coded portions of lengths representing the covalent radii and Van der Waals' radii of different atoms bonded to said central atom, with each cylindrical section being sized to represent accurately to scale the sigma bond distances between said bonded atoms. The space-filling members include a sectioned spherical body representing the central atom and having a radius corresponding to the length of the inner color-coded portions of said cylindrical sections and adapted to be assembled over the inner joined ends of said cylindrical sections with its center located at said central point and said body covering over said inner colored portions.

Since a group of the cylindrical sections lie on a common plane, the sections of said cylindrical body are separated along a plane which conforms to the common plane of said cylindrical sections. Means are provided to releasably join together the sections of said cylindrical body in such a manner that a section can be removed to reveal the inner framework structure. Additional space-filling members are provided to be mounted on the cylindrical sections and to cover over the outer color-coded portions thereof, these additional space-filling members representing atoms bonded to the central atom, or molecular orbitals.

Additional objects and advantages of the invention will become apparent during the course of the following specification when taken in connection with the accompanying drawings in which.

Figure 1:
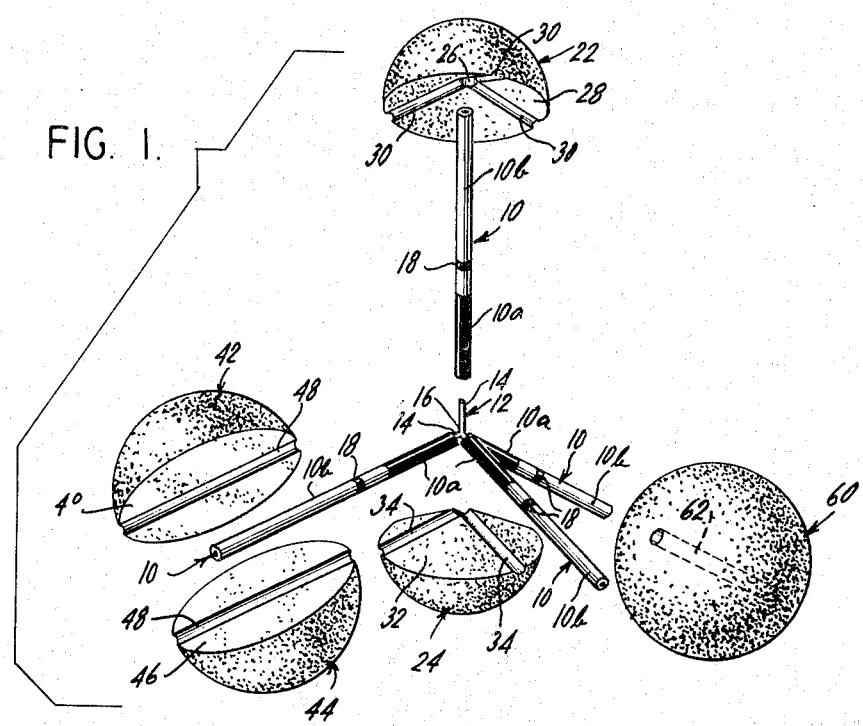
FIG. 1 is an exploded view of a combined framework and space-filling model in accordance with the present invention, and depicting a methane molecule.

Referring in detail to the drawings, there is shown in FIG. 1 a plurality of tubing sections 10 which connect together to form a framework orbital model depicting a methane molecule. These tubing sections 10 are preferably elastomeric plastic extrusions, and are sized to frictionally receive and retain the arm sections of a coupling element 12 representing a valence cluster.

In my aforementioned U.S. patent application Ser. No. 356,546, there is shown and described in detail the manner in which such tubing sections and coupling elements are constructed and assembled together to form a large variety of molecular and atomic models of the framework type. The coupling elements, intended to represent valence clusters consist of thin cylindrical arms, preferably metal, which meet together at a central point constituting the center of an atom. The cylindrical arms generally point along the symmetry axis of the atomic valence orbitals, and the angles at which these arms are disposed represent accurately the bond angles in the assembled molecular models, that is to say the orientation of the atomic valence orbitals in space. For purposes of representing the various bond angles occurring in nature, the coupling elements included in my aforementioned patent application were shown with arms arranged at varying angles forming respectively a tetrahedron, a trigonal bipyramid, an octahedron, a right angle, and portions of a trigonal bipyramid.

By way of illustration herein, the coupling element 12 is shown having four arms 14 all connected at a common center 16 to form a tetrahedron, with the angles between the sections being respectively 109°, to accurately portray the valence cluster for a methane molecule. It is to be understood that the invention herein is not limited to this illustrative embodiment and is intended to be applied to any of the various coupling element structures, tubular coupling structures, and framework assemblies thereof, as described in my aforesaid patent application.

As was previously indicated, the coupling elements represent valence clusters which include the center of the atom with the arm sections thereof representing the orientation of the atomic valence orbitals in space. The atoms are then interconnected by means of sections of tubing to depict selected molecules. The tubing is made of precise lengths to a selected scale, preferably within the range of 5 mm./angstrom unit to 100 mm./angstrom unit, to accurately represent the bond distance between atoms. Portions of the plastic tubing are colored for atom coding, for example, black to depict carbon, white to depict hydrogen, red for oxygen, blue for nitrogen, etc. In the tubing sections 10 shown in FIG. 1 herein, for example, the end portions 10a are colored black to depict carbon, while the opposite end portions 10b are colored white to depict hydrogen. The lengths of the colored sections 10a and 10b accurately depict the relative sizes of the covalent radii of the carbon and hydrogen atoms respectively. In addition, a band 18 may be formed on each of the white portions 10b to mark accurately the center of the bonded hydrogen atom.

The tubing sections 10 are assembled in the manner shown in FIG. 1, with a tubing section 10 mounted upon each of the arms 14 of the coupling element 12. The block end portions 10a of the tubing sections meet at the center 16 of the coupling element 12, representing the center of the carbon atom, and the combined lengths of portions 10a thus depict the Van der Waals' radii away from the carbon atom toward the hydrogen atoms which are represented by the white end portions 10b.

The foregoing represents a framework molecular model made in accordance with my pending application Ser. No. 356,546. In accordance with the present invention, means are provided to convert such a framework model into a space-filling model. These means are in the form of solid pieces having the precise shapes and sizes of the atoms and orbitals to be represented, which pieces are constructed to be mounted upon and cover the framework structure to produce a space-filling model.

In the example shown, a space-filling, three dimensional model of the carbon atom at the center of the framework methane model would be spherical would have its center located precisely at the center 16 of the coupling element 12, and would have a radius corresponding precisely to the Van der Waals' radii indicated by the length of the black end portions 10a of the tubing sections 10. To comply with these requirements, a space-filling member 20 is provided in the form of a spherical ball having a radius precisely equal to the length of the black end portion 10a of any one of the tubing sections 10.

The ball 20 is made of a light-weight material, preferably polystyrene foam, or may be molded of plastic in hollow form, and is constructed to fit over the inner joined ends of the tubing sections 10, and to fill the space defined by the four black end portions 10a of said tubing sections. In order to permit the ball 20 to be mounted at the center of the space-filling model and to receive and enclose all of the four tubing sections, the ball is divided into two complementary sections 22 and 24 which interfit about the inner end portions of said tubing sections to form a completed space-filling member representing the central carbon atom.

The particular framework model shown herein, representing a methane molecule, is symmetrical, but when disposed in the attitude shown in FIG. 1, one of the tubing sections 10 is vertically upstanding, and each of the other three tubing sections extend downwardly and outwardly at an angle of 109° therefrom. The ball sections 22 and 24 are therefore shaped to conform to the geometry of the framework model. The upper section 22 has a central through bore 26 sized to receive the vertically-upstanding tubing section 10 so that the section 22 may be inserted thereon and slid downwardly to the center of the model. The bore 26 has an axis extending along the diameter of the assembled ball. The ball section 22 is formed with a lower concave surface 28 which is conical, with the plane of said surface arranged at an angle of 109° to the axis of bore 26. In the concave lower surface 28 are formed three radially-extending, semi-cylindrical slots 30, each sized to receive and snugly embrace the upper half of one of the tubing sections 10.

Figure 3:
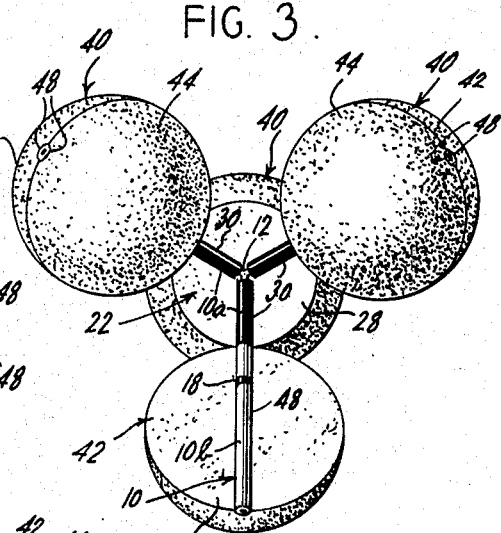
FIG. 3 is a bottom plan view of the assembled model of FIG. 2 with a portion of the space-filling sections removed to reveal the underlying framework parts.

The ball section 22 is greater than a hemisphere. Specifically, the circumference of the sections 22 from the center of bore 26 to the edge of the lower surface 28 defines an arc having an angle identical to the angle between the vertically-upstanding tubing section and any of the lower tubing sections, namely an angle of 109°. Thus, when the ball section 22 is mounted on the vertical tubing section and slid to the center of the framework model, the black end portions 10a of the three lower tubing sections are respectively received within the slots 30, and the section 22 completely covers over the end portions 10a, with the bottom edge of the section 22 registering with the outer ends of the black portions of the three lower tubular sections 10, as shown in FIG. 3. At the same time, the bore 26 completely encloses the black end section 10a of the vertical tubing section 10. The lower ball section 24 has an upper surface 32 which is convex and conical, and arranged at the same angle as the concave surface 28 of upper section 22, so as to fit flush thereagainst. In the surface 32 is formed three semi-cylindrical radial slots 34 arranged at angles of 109° with each other, and adapted to register with the respective slots 30 in the upper section 22 to form complete cylindrical bores sized to receive the tubing sections.

After the upper section 22 has been mounted in the manner previously described, the lower section 24 is assembled therewith to complete the spherical space-filling member 20, the center of which is located precisely at the center of the framework model, and the outer surface of which is aligned with the outer edges of the black end portions 10a of tubing sections 10. The sections 22 and 24 are connected together by suitable fastening means such as pins (shown in FIG. 4) or magnets (shown in FIG. 5), which will be hereinafter described in greater detail.

Figure 2:
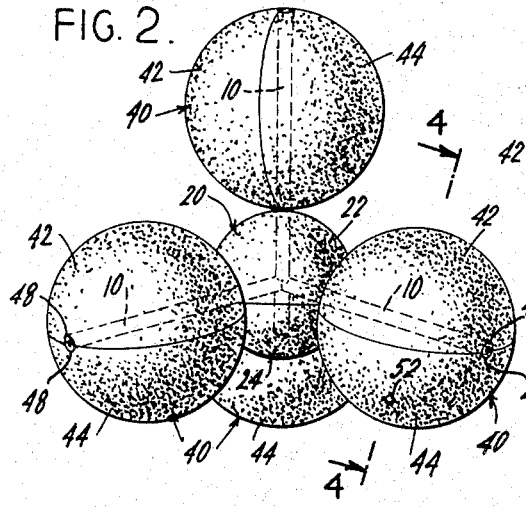
FIG. 2 is a side elevational view of the model of FIG. 1 in fully assembled condition, with the inner framework portion shown in broken line.

Space-filling members are also provided to represent the hydrogen atoms of the methane framework model. These members are constructed to be mounted on the outer ends of the tubing sections 10, and to cover over the outer white end portions 10b of said tubing sections. In FIG. 1 there is shown such a space-filling member 40 in the form of a spherical ball formed of two identical hemispherical sections 42 and 44. The planar surface 46 of each section 42 and 44 is formed with a diametrical semicylindrical slot 48. The half sections 42 and 44 are assembled together as shown in FIG. 2, with the end of a tubing section 10 received in the registering slots 48, and the body of the completed ball completely covering the white end portion 10b thereof to depict a hydrogen atom in three dimensional form with its Van der Waals' radius to scale.

Figure 4:
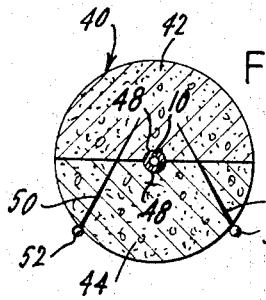
FIG. 4 is a section as taken along line 4—4 of FIG. 2, and showing a plurality of pins locking together the space-filling sections.

The space-filling member 40 is made of the same foam material as the member 20. Since this material is frangible, it may be easily pierced by a pin which may be employed to lock together the half sections 42 and 44. In FIG. 4 there is shown two pins 50 which are inserted into the half section 44 angularly in opposite directions. The shanks of the pins 50 are of sufficient length to extend entirely through the half section 44 and well into the half section 42 so as to releasably lock the half sections together. The pins 50 have small heads 52 which permit their convenient removal for disassembling the ball sections.

Figure 5:
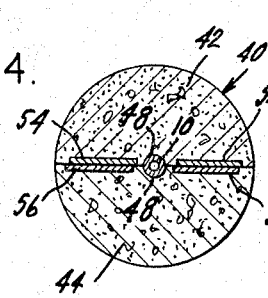
FIG. 5 is a section similar to FIG. 4, but showing modified means for locking together the space-filling sections, wherein magnets are employed.

In FIG. 5, an alternate form of fastening means is shown. In this embodiment, a pair of magnetic elements 54 are secured to the planar surface 46 of the ball half section 42, and a complementary pair of magnetic elements 56 are secured to the planar surface of the half section 44. These magnetic elements 54 and 56 may be in the form of commercially-available rubber-bonded ferrite magnets which may be embedded within the planar surfaces 46 so that their outer surfaces are flush therewith, and secured to the respective ball sections by suitable adhesive. The respective pairs of magnetic elements 54 and 56 register with each other and are arranged to attract each other so as to hold together the ball sections 42 and 44.

FIG. 1 also shows a spherical space-filling member 60 made in the form of a solid, unsectioned ball having a bore 62 opening through the surface thereof and extending along a portion of its diameter. The ball 60 is sized to represent a hydrogen atom and may be mounted on one of the tubing sections 10 by merely inserting the free end of the tubing section into the bore 62 until the member 60 engages the surface of the assembled central space-filling member 20, at which point the member 60 will be properly located and will completely cover over the white end portion 10b of the tubing section 10.

FIG. 2 shows the methane framework model completely converted into a space-filling model by the members of the present invention. The space-filling member 20 is assembled at the center of the model, and is surrounded by four space-filling members 40 which are mounted on the tubing sections of the framework model. In place of the assembled members 40, four of the solid members 60 can be employed to represent the hydrogen atoms of the space-filling model.

FIG. 3 shows the manner in which the space filling members may be partially disassembled to reveal the framework structure therein. In this view, the lower section 24 of central member 20 has been removed to reveal the black end portions 10b of the tubular sections 10, and the half section 44 of one of the members 40 has been removed to reveal one of the white end sections 40b and the band 18. In this manner, both the framework and space-filling aspects of the model may be studied simultaneously.

It is to be understood that the space-filling members may be shaped to represent atomic and molecular orbitals, and would also be sectioned to conform to the geometry of the various coupling units employed in the model set, as described in my aforementioned patent application.

While preferred embodiments of the present invention have been shown and described herein, it is obvious that numerous omissions, changes and additions may be made in such embodiments without departing from the spirit and scope of the invention.

What I claim is:

1. A molecular model assembly comprising a framework structure and a space-filling member adapted to be mounted upon said framework structure, said framework structure including a plurality of elongated cylindrical arm sections meeting at a central point representing the center of an atom and extending angularly outward from said central point in accordance with the symmetry axes of valence orbitals and bond angles of said atom, said cylindrical arm sections having respective inner color-coded portions of lengths representing to scale the covalent radius of said central atom, and outer color-coded portions representing the covalent radii and Van der Waals' radii of different atoms bonded to said central atom, said cylindrical arm sections being respectively sized to represent accurately to scale the sigma bond distances between bonded atoms, said space-filling members including a sectional spherical body having a radius corresponding to the length of the inner color-coded portion of each cylindrical arm section and being adapted to be assembled over the inner ends of said arm sections with its center located at said central point and said body covering over all of the inner colored portions of said cylindrical arm sections, and means for releasably connecting together the sections of said spherical body.

2. A molecular model assembly according to claim 1 in which a plurality of said arm sections extend from said central point in a common plane, and in which the body of said spherical space filling member is divided into two complementary interfitting sections along said common plane.

3. A molecular model assembly according to claim 1 in which a plurality of cylindrical arm sections extend from said central point in a common plane, said spherical space-filling member being divided into two complementary, interfitting sections having abutting surfaces, said abutting surfaces being shaped to correspond to the common plane of said cylindrical arm sections.

4. A molecular model assembly according to claim 1 in which one of said cylindrical arm sections extends from said central point in a first plane, and a plurality of arm sections extend from said central point in a common second plane, said spherical space-filling member being divided into two complementary, interfitting sections along said second plane, and one of said sections having a through bore for receiving said one cylindrical arm section.

5. A molecular model assembly according to claim 1 in which said space-filling member body is made of light, frangible material and in which said connecting means comprises a plurality of pins, each extending through one of said sections and into the other section.

6. A molecular model assembly according to claim 1 in which said connecting means comprises magnetic members mounted upon the abutting surfaces of the sections of said space-filling member.

7. A molecular model assembly comprising a framework structure and a plurality of space-filling members adapted to be mounted upon said framework structure, said framework structure including a plurality of elongated cylindrical arm sections meeting at a central point representing the center of an atom and extending angularly outward from said central point in accordance with the symmetry axes of valence orbitals and bond angles of said atom, each cylindrical arm section having an inner color-coded portion of a length representing to scale the covalent radius of said central atom, at least some of said cylindrical arm sections having an outer color-coded portion representing the covalent radius and Van der Waals' radius of a different atom bonded to said central atom, each of said cylindrical arm sections being sized to represent accurately to scale the sigma bond distances between bonded atoms, said space-filling members including a sectioned spherical member having a radius corresponding to the length of the inner color-coded portion of each cylindrical arm section and being adapted to be assembled over the inner ends of said arm sections with its center located at said central point and its body covering over all of the inner colored portions of said cylindrical arm sections, means for releasably connecting together the sections of said spherical member, and spherical members adapted to be mounted on the outer ends of said cylindrical arm sections and sized to cover over the outer color-coded portions thereof.

8. A molecular model assembly comprising a framework structure including a coupling unit representing the center and the directed valence orbitals of a single atom, and having a plurality of arms angularly arranged in accordance with the symmetry axes of valence orbitals and bond angles of the atom to be depicted by said coupling unit, and a plurality of elongated cylindrical sections each sized for frictional mounting at each end on respective arms of said coupling units, said cylindrical sections being respectively sized to represent accurately to scale the sigma bond distances between bonded atoms represented by said coupling units, and the Van der Waals' radii of unshared electron pair orbitals, pi orbitals and polynuclear pi orbitals, each cylindrical section having an inner color-coded portion of a length representing to scale the covalent radius of said central atom and an outer color-coded portion representing to scale the covalent radius and Van der Waals' radius of a different univalent atom bonded to said central atom, said space-filling members including a sectional spherical member representing said central atom and having a radius corresponding to the length of the inner color-coded portion of each cylindrical section, the sections of said spherical member adapted to be assembled over the inner ends of said cylindrical sections with the center of said spherical member located at said central point and its body covering over all of the inner colored portions of said cylindrical sections, means for connecting together said assembled sections of said spherical member and spherical members adapted to be mounted on the outer ends of said cylindrical sections and to cover over the outer color-coded portions thereof.

9. A molecular model assembly according to claim 8 in which a plurality of said cylindrical sections extend from said coupling unit in a common plane and in which said central spherical space-filling member is divided into two complementary interfitting sections along said common plane, said sections having abutting surfaces shaped to correspond with said common plane, each of said sections having slots therein sized to receive the cylindrical sections arranged in said common plane.

10. A molecular model assembly according to claim 9 in which the spherical members mounted on the outer ends of said cylindrical sections are each formed in two half sections and include means for connecting said half sections in mounted position about said cylindrical sections, the sections of said outer space-filling members and central space-filling member being selectively removable to reveal the framework structure therein.

11. A molecular model assembly according to claim 8 in which said spherical members are made of frangible material and in which said connecting means comprises a plurality of pins each extending through one of the sections of a spherical member and into the other section thereof.

12. A molecular model assembly according to claim 11 in which said spherical members are made of plastic foam.

13. A molecular model assembly according to claim 8 in which said connecting means comprises magnetic members mounted upon the abutting surfaces of the complementary sections of each space-filling members.

14. A molecular model assembly according to claim 8 in which said coupling unit comprises four cylindrical arms each having one end joined to the others at a common point, with the angle between adjacent arms being 109° to form a tetrahedron.

References Cited

FOREIGN PATENTS 712,758 7/1965 Canada.
994,566 8/1951 France.

EUGENE R. CAPOZIO, *Primary Examiner.*

H. S. SKOGQUIST, *Assistant Examiner.*